Feb. 17, 1948.　　　　C. H. WHITE　　　　2,436,132
FERTILIZER DISTRIBUTOR
Original Filed Jan. 31, 1941　　2 Sheets-Sheet 1

INVENTOR.
CHARLES H. WHITE
ATTORNEYS

Feb. 17, 1948.　　　　C. H. WHITE　　　　2,436,132
FERTILIZER DISTRIBUTOR
Original Filed Jan. 31, 1941　　2 Sheets-Sheet 2
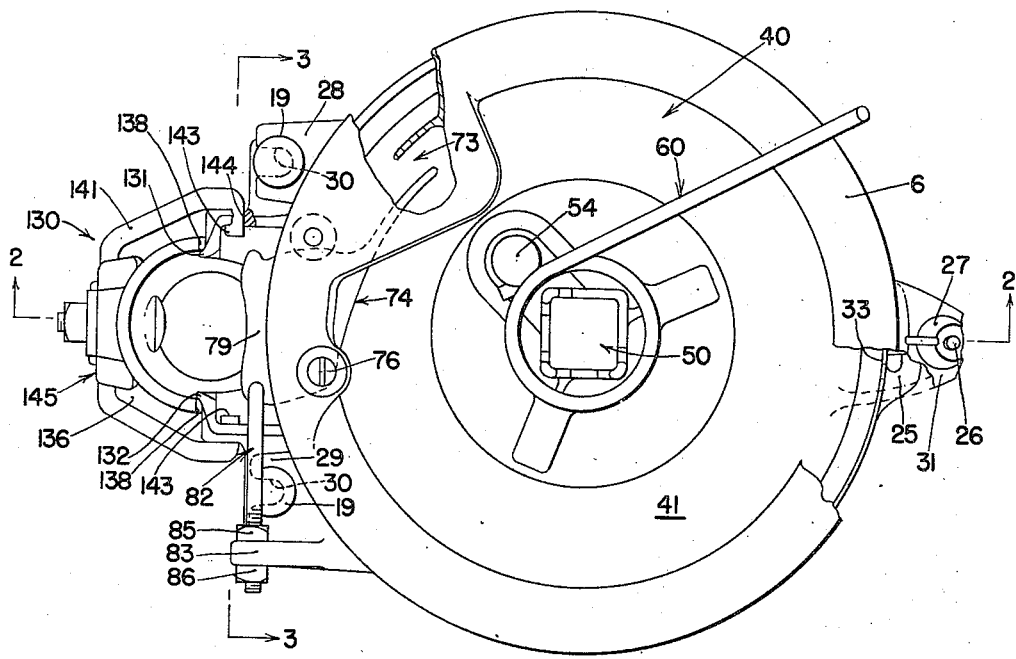
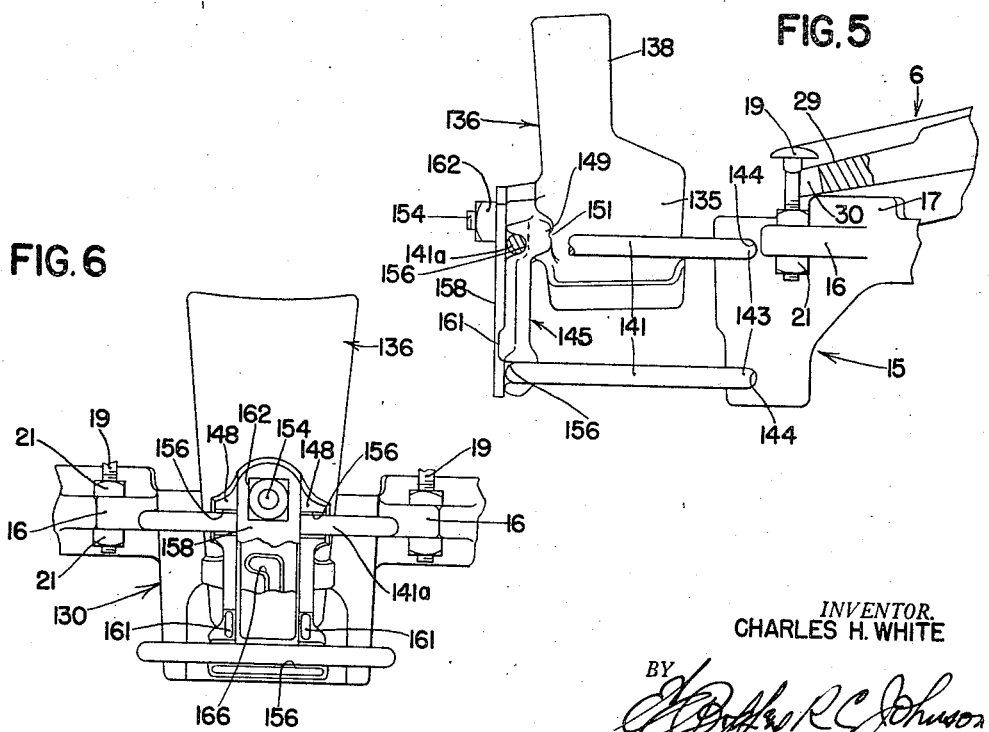
INVENTOR.
CHARLES H. WHITE
BY
ATTORNEYS Patented Feb. 17, 1948

2,436,132

UNITED STATES PATENT OFFICE 2,436,132

FERTILIZER DISTRIBUTOR

Charles H. White, Moline, Ill., assignor to Deere & Company, Moline, Ill., a corporation of Illinois Original application January 31, 1941, Serial No. 376,751. Divided and this application March 1, 1944, Serial No. 524,837

10 Claims. (Cl. 111—67)

This application is a division of my co-pending application, Serial No. 376,751, filed January 31, 1941, (issued as Patent No. 2,369,508, Feb. 13, 1945).

The present invention relates generally to agricultural machines and particularly to distributing mechanism especially adapted to serve as an attachment for distributing fertilizer during planting of seed or when side dressing row crops.

The object and general nature of the present invention may be said to lie in the provision of a fertilizer hopper bottom ring and base construction in which is incorporated a new and improved spout so constructed that raising the fertilizer furrow opener when the fertilizer tube is filled or substantially filled with fertilizer will not cause damage to any of the parts.

These and other objects and advantages of the present invention will be apparent to those skilled in the art after a consideration of the following detailed description, taken in conjunction with the accompanying drawings.

In the drawings:

Figure 4 is a fragmentary plan view of the spout construction and the fertilizer hopper bottom on which it is carried.

Figures 5 and 6 are side and rear views of the spout construction when the parts thereof are separated, as by lowering the tools when the fertilizer tube is filled with fertilizer.

Figure 1:
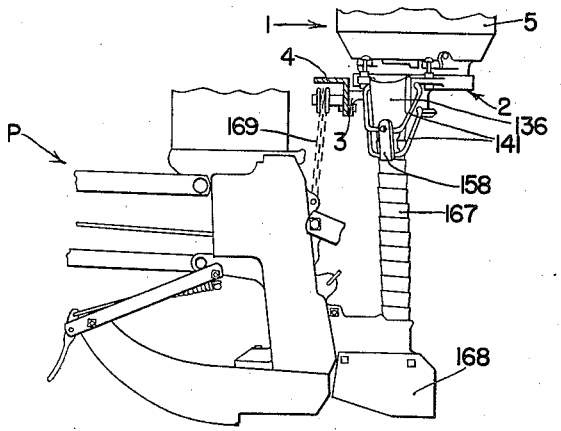
Figure 1 is a fragmentary view showing a fertilizer attachment secured in place on a planter.
Figure 2:
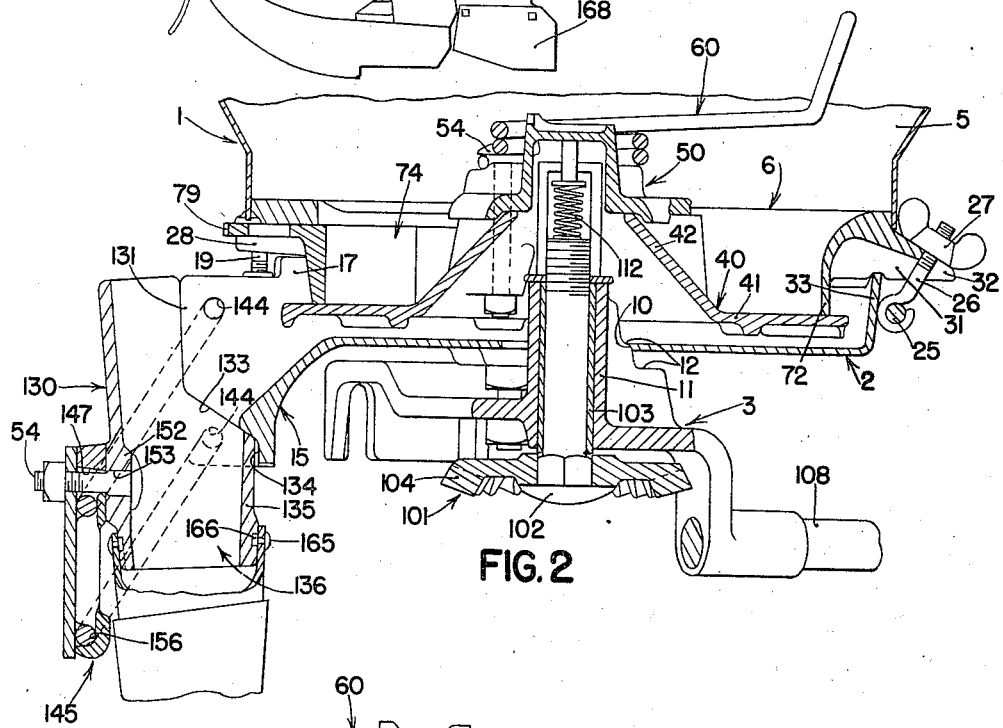
Figure 2 is a sectional view taken generally along the line 2—2 of Figure 4.
Figure 3:
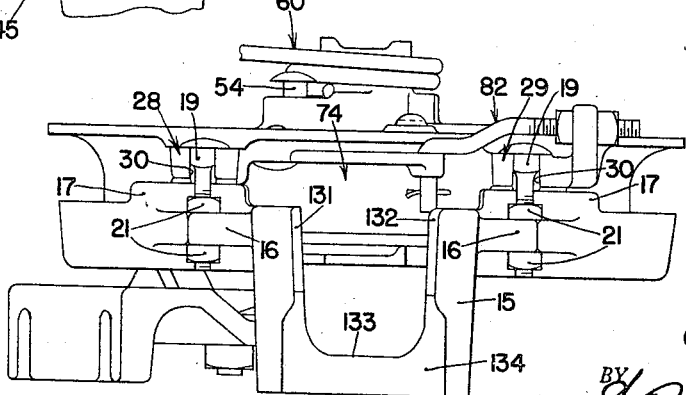
Figure 3 is a view taken generally along the line 3—3 of Figure 4.

Referring now more particularly to Figures 1 and 2, the reference numeral 1 indicates a hopper for fertilizer and the like, forming a part of an agricultural machine, such as a planter P. The hopper 1 is supported on a base 2 and the latter in turn is carried upon a suitable bracket 3 fixed to the planter frame 4. The hopper 1 includes a fertilizer can 5 to the lower end of which a hopper bottom ring 6 is fixed in any suitable manner. The hopper base 2 comprises a flat member and includes a central opening 10 through which the bearing sleeve section 11 of the bracket 3 extends. Shouldered portions 12 are formed on the bearing section 11 or on the bracket 3 so as to receive various kinds of hopper bases, as desired. The base 2 also includes a spout section 15 on opposite sides of which apertured lugs 16 are disposed, and adjacent the lugs 16 are abutment flange sections 17, on which the hopper bottom ring 6 is mounted, as more clearly disclosed in the parent case identified above.

A pair of anchoring bolts 19 are disposed, respectively, in the lugs 16, and each bolt has a pair of lock nuts 21 thereon, one above and one below the associated lug 16. On the side of the hopper base 2 opposite the lugs 16 and flanges 17, is an apertured lug 25 in which a bolt 26 is swiveled. The latter carries a wing nut 27. The hopper bottom ring 6 carries a pair of lugs 28 and 29, each of which is provided with a slot 30, the open end of which faces rearwardly or toward the spout section of the hopper base. At the other side of the hopper bottom ring 6 the latter carries a lug 31 which is provided with a slot 32, the open end of which faces forwardly and in a position to receive the swivel bolt 26 which is carried by the hopper base. The latter also carries an abutment flange section 33 which the lower surface of the forward lug 31 on the hopper bottom ring 6 engages.

Held up against the lower edge of the hopper bottom ring 6 is a fertilizer feed plate 40 comprising a circular section 41 and a conical central section 42. A cap member 50 is secured to the upper end of the conical section 42 and is held in place by a bolt 54 which extends downwardly through aligned openings formed in bosses or the like carried by the cap 50 and the feed plate 40. Thus, in effect, the cap member 50 forms a part of the plate 40 and closes the otherwise open central section thereof. The bolt 54 also serves to secure a spring wire agitator 60 to the cap 50.

The fertilizer feed plate 40 and the spring wire agitator 60 are driven by suitable mechanism which connects with the cap member 50 that carries the spring wire agitator, and the driving mechanism includes means for resiliently holding the feed plate 40 up against the lower edge of the hopper bottom ring 6 and the lower edge of an associated adjustable feed gate 74 which is pivoted at 76 to an apertured lug on the hopper bottom ring 6, the vertical flange section 72 of the hopper ring 6 being interrupted at 73 to form a feed opening in which the gate member 74 is disposed, as best shown in Figure 4. The gate 74 is formed with an outwardly disposed flange or arm 79 to which one end of an adjusting member 82 is pivotally connected. The other end of the member 82 is screw-threaded and passes through an opening in a lug 83 which is formed as an extension of the lug 29. A pair of lock nuts 85 and 86 are disposed on the threaded section of the member 82 and serve as means for shifting the gate in one direction or the other and for holding the gate in any position of adjustment.

The driving mechanism for the plate 40 is indicated at 101 and includes a bolt 102 and bushing 103 serving as a driving shaft to the lower end of which a gear 104 is fixed. The latter is rotated by a pinion (not shown) carried on the inner end of a seeding shaft 108. The upper end of the driving shaft means 102, 103 carries a spring 112 and associated parts which act against the cap member 50 for holding the feed plate 40 up against the lower edge of the hopper bottom ring 6 and the lower edge of the gate 74. When the apparatus is driven, the pressure plate 40 and the spring agitator 60 are rotated in a direction to cause the fertilizer to be forced outwardly through the opening 73 and past the gate 74 into the spout section 15 of the base 2.

The present invention is particularly concerned with the spout construction which will now be described. The spout construction, which is indicated in its entirety by the reference numeral 130 and which includes the spout section 15 as a part thereof, comprises two separable parts one of which is movable upwardly relative to the other part and said one part carrying the fertilizer feed tube so that breakage of parts is not likely to occur if the furrow openers should be raised with hardened fertilizer in the tube, which sometimes occurs if the fertilizer is not cleaned out at the end of the day and left over night. The spout section 15 is formed integrally with the base 2 and is essentially a semi-cylindrical part with the open portion facing rearwardly. The semi-cylindrical section 15 is provided with a pair of vertical ribs 131 and 132 (Figure 4) merging into and joining a rib 133 (Figure 2) which is disposed in a downwardly angled plane. The latter rib section 133 overhangs a semi-cylindrical socket 134 into which the lower portion 135 of a companion spout section 136 is adapted to be received, as best shown in Figure 2.

The upper edge of the section 135 is disposed in a plane inclined downwardly and is adapted to fit snugly underneath the rib 133. The remaining upper portion of the spout section 136 is also generally semi-cylindrical with vertical edges 138 adapted to embrace the vertical ribs 131 and 132 formed on the spout section 15. The two spout sections 15 and 136 are normally held together in operating position by a pair of links 141 which are preferably identical in construction. Each link consists generally of a U-shaped part having laterally inturned ends 143 rockably mounted in openings 144 formed in the spout section 15 adjacent the plane of the anchoring bolts 19.

A pivot block 145 is adapted to be secured to the rear portion of the spout section 136, and to this end is formed with an opening 147 at its upper end and a pair of flanking lugs 148 each of which is provided with a V-shaped notch 149. The notches 149 are adapted to engage companion knife edges 151 which are disposed on opposite sides of an apertured boss 152 formed on the lower portion of the spout section 136. The aperture 153 in the boss 152 is square and is adapted to receive the head of a bolt 154 that extends outwardly to receive the opening 147 in the block 145. The latter member is provided with a pair of transverse grooves 156 that receive the central portions 141a of the U-shaped links 141. A strap 158 apertured at its upper end to receive the outer end of the bolt 154, is disposed over the intermediate portions of the U-shaped link members 141 so as to hold them in the block 145. To this end, the latter is provided with a pair of lugs 161 spaced apart to receive the strap 158 therebetween, thus preventing the latter from getting out of position. When the nut 162 on the bolt 154 is tightened, it will be seen that the block 145 is firmly fixed to the spout section 136 so as to form, in effect, a part thereof, and at the same time the strap 158 holds the U-shaped links 141 in position so that the spout section 136 is swingably connected to the hopper base 2.

The openings 144 in the base, in which the laterally inturned ends 143 of the U-shaped links 141 are disposed, are placed above the grooves 156 in which the links 141 are pivotally connected with the spout section 136. Figure 2 shows the parts in operating position, in which it will be noted that the links 141 angle downwardly and rearwardly in directions substantially perpendicular to the plane of the rib 133 and the upper edge of the spout portion 135.

The spout section 136 is provided with a pair of L-shaped recesses 166 by which a fertilizer tube 167 may be releasably connected by pins 165, as is common practice. The lower end of the fertilizer tube 167 discharges fertilizer into a furrow opener 168 of conventional construction, and the furrow opener 168 is adapted to be raised and lowered into and out of transport and operating position by suitable mechanism of any desired construction, represented by a lifting chain 169. From Figure 1 it can be seen that if fertilizer is left in the tube 167 over night and hardens therein, while at the same time the furrow opener 168 is left in its lowered position, the subsequent actuation of the lifting means 169 and the resulting upward movement of the furrow opener 168 would not be affected by the fact that the fertilizer has hardened in the tube 167 preventing the latter from flexing as is normal. In this event, the upward movement of the furrow opener 168 would act through the tube 167 and the hardened fertilizer therein, against the swingably mounted spout section 136, forcing the same upwardly and laterally outwardly with respect to the hopper base 2, as shown in Figures 5 and 6. Thus, the two spout sections 15 and 136 merely separate and no damage occurs to any of the parts. This gives the farmer an opportunity to loosen the fertilizer in the tube 167 to restore the parts to operating condition. Thus, with the fertilizer furrow opener 168 raised, the loosening of the fertilizer in the tube 167 will immediately permit the weight of the spout section 136 to swing the same downwardly from its dotted line position to its full line position, whereupon the unit is ready for operation.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement having a furrow opener and lifting means therefor, the combination with a fertilizer distributing mechanism including a base and a flexible fertilizer tube extending downwardly to said furrow opener, of a spout construction carried by said base for delivering fertilizer from said mechanism to said tube, comprising separable parts, said tube being connected with one part, and means whereby said one part is connected with the other part so as to be movable generally vertically and laterally away from the other part by generally upwardly directed force exerted thereon through said tube so that if, when said lifting means is actuated, said tube does not flex, said one part moves away from the other to accommodate said tube being lifted bodily with said furrow opener.

2. In a fertilizer distributor, a base having a first spout section, a second spout section movable into and out of cooperative registration therewith, and a pair of generally downwardly and outwardly extending parallel links connected at the upper ends with said first spout section and at the lower ends with said second spout section so as to cause the latter to swing outwardly and upwardly away from said first spout section when an upwardly directed force is applied to the second spout section.

3. In a fertilizer distributor, a hopper base, a fertilizer discharge spout comprising two relatively movable sections, and means comprising a generally downwardly and outwardly extending link pivotally connected at its ends to said spout sections, respectively, for normally connecting said sections but providing for movement of one section relative to the other to separate them upon the application of upwardly directed force thereto.

4. Fertilizer distributing mechanism including a base, a spout construction carried by said base, and a normally flexible tube for receiving fertilizer from said spout construction, the latter comprising separable parts, one of said parts having an outwardly and downwardly facing opening and the other having an upwardly and inwardly facing opening adapted to fit against said first opening, and means connecting said spout parts so that said other spout part can move upwardly and away from said one, spout part under the application of an upwardly directed force whereby, if the lower end of the tube is raised but the tube does not flex, said one part moves away from the other to accommodate said tube being lifted.

5. In a fertilizer distributor, a base having a first spout section, a second spout section movable into and out of cooperative registration therewith, and a pair of swingable link means connecting said sections.

6. In a fertilizer distributor, a hopper base, a fertilizer discharge spout comprising two relatively movable sections, and a pair of approximately parallel link means normally connecting said sections, said link means being disposed in downwardly and outwardly extending positions to dispose one section lower than the other and to provide for upward and outward movement of said one section relative to the other upon the application of upwardly directed force thereto.

7. In a fertilizer distributor, a hopper base, a fertilizer discharge spout comprising a downwardly and outwardly facing socket section fixed to said base, an upwardly and inwardly facing lower spout section having a portion cooperating with said downwardly and outwardly facing socket section to receive fertilizer from said base, and means connecting said lower spout section with said base so that the lower spout section moves upwardly away from the socket section upon the application of upward pressure to said lower spout section.

8. In a fertilizer distributor, a first spout section, a second spout section adapted to be moved toward the first spout section, said spout sections having mutually engaging portions disposed in a plane that extends generally upwardly and outwardly away from the fertilizer distributor, and link means extending generally perpendicularly to said plane for causing the second spout section to be moved away from the first spout section when the second section is moved upwardly relative to the first spout section.

9. A hopper construction comprising a base having a flange interrupted at one part to form a discharge opening and an integral downwardly extending section which serves as part of a spout, said section having socket means in the lower part, means for directing material through said discharge opening, a second spout section having a lower part adapted to seat in said socket, means to receive the material discharged through said opening, and link means pivotally connected with said second spout section and extending generally upwardly therefrom at an angle and pivotally connected with said downwardly extending section so that said second spout section is free to swing upwardly and outwardly away from said socket means.

10. In an agricultural implement having a furrow opener, lifting means therefor, a fertilizer distributing mechanism including a base and a flexible fertilizer tube extending downwardly to said furrow opener, the combination therewith of a spout construction carried by said base for delivering fertilizer from said mechanism to said tube, comprising separable parts, said tube being connected with one part, and means whereby said one part is connected with said other part so as to be swingable generally vertically and laterally away from the other part so that if, when said lifting means is actuated, said tube does not flex, said one part moves away from the other to accommodate said tube being lifted bodily with said furrow opener.

CHARLES H. WHITE.

REFERENCES CITED

The following references are of record in the file of this patent:

UNITED STATES PATENTS

| Number | Name | Date |
|---|---|---|
| 105,690 | Ingels | July 26, 1870 |
| 176,965 | Kuhns et al. | May 2, 1876 |
| 1,275,645 | Benedetto | Aug. 13, 1918 |
| 292,893 | Carr | Feb. 5, 1884 |
| 2,210,994 | White | Aug. 13, 1940 |
| 1,897,355 | Altgelt | Feb. 14, 1933 |
| 1,103,357 | Gilroy | July 14, 1914 |
| 422,987 | Smith | Mar. 11, 1890 |
| 1,507,688 | Schuett | Sept. 9, 1924 |

FOREIGN PATENTS

| Number | Country | Date |
|---|---|---|
| 290,567 | Germany | Mar. 8, 1916 |